(12) United States Patent
Sowards et al.

(10) Patent No.: US 12,453,534 B2
(45) Date of Patent: Oct. 28, 2025

(54) ULTRASOUND PROBE WITH INTEGRATED DATA COLLECTION METHODOLOGIES

(71) Applicant: Bard Access Systems, Inc., Salt Lake City, UT (US)

(72) Inventors: Steffan Sowards, Salt Lake City, UT (US); William Robert McLaughlin, Bountiful, UT (US); Anthony K. Misener, Bountiful, UT (US)

(73) Assignee: Bard Access Systems, Inc., Salt Lake City, UT (US)

(*) Notice: Subject to any disclaimer, the term of this patent is extended or adjusted under 35 U.S.C. 154(b) by 367 days.

(21) Appl. No.: 17/987,717

(22) Filed: Nov. 15, 2022

(65) Prior Publication Data

US 2023/0148993 A1 May 18, 2023

Related U.S. Application Data

(60) Provisional application No. 63/280,047, filed on Nov. 16, 2021.

(51) Int. Cl.
A61B 8/00 (2006.01)

(52) U.S. Cl.
CPC ............ A61B 8/463 (2013.01); A61B 8/4444 (2013.01)

(58) Field of Classification Search
CPC .......... A61B 2560/0462; A61B 8/4438; A61B 90/96; A61B 2017/3413; A61B 2562/08; A61B 8/463
See application file for complete search history.

(56) References Cited

U.S. PATENT DOCUMENTS 5,325,293 A 6/1994 Dorne
5,549,554 A 8/1996 Miraki
(Continued)

FOREIGN PATENT DOCUMENTS

CN 101854853 A 10/2010
CN 105054962 A 11/2015
(Continued)

OTHER PUBLICATIONS

PCT/US2023/025845 filed Jun. 21, 2023 International Preliminary Report on Patentability dated Dec. 18, 2024.
(Continued)

Primary Examiner — Gerald Johnson
(74) Attorney, Agent, or Firm — Rutan & Tucker LLP

(57) ABSTRACT

An ultrasound-imaging system includes an ultrasound probe and a console. The ultrasound probe includes (i) an array of ultrasonic transducers, activated ultrasonic transducers of the array of ultrasonic transducers configured to emit generated ultrasound signals into a patient, receive reflected ultrasound signals from the patient, and convert the reflected ultrasound signals into corresponding electrical signals of the ultrasound signals for processing into an ultrasound image, and (ii) a secondary data collection module. The console includes one or more processors and a non-transitory computer-readable medium having stored thereon logic, when executed by the one or more processors, causes operations that can include: receiving and processing the electrical signals to generate the ultrasound image, receiving secondary data from the secondary data collection module, wherein the secondary data is data other than the electrical signals corresponding to reflected ultrasound signals, and providing a notification to administrator that includes the secondary data.

20 Claims, 10 Drawing Sheets

(56) References Cited

U.S. PATENT DOCUMENTS

| | | |
|---|---|---|
| 5,573,529 A | 11/1996 | Haak et al. |
| 5,908,387 A | 6/1999 | LeFree et al. |
| 5,970,119 A | 10/1999 | Hofmann |
| 5,997,497 A | 12/1999 | Nita et al. |
| 6,012,034 A | 1/2000 | Hamparian et al. |
| 6,074,367 A | 6/2000 | Hubbell |
| 6,543,642 B1 | 4/2003 | Milliorn |
| 6,554,771 B1 | 4/2003 | Buil et al. |
| 6,592,565 B2 | 7/2003 | Twardowski |
| 6,601,705 B2 | 8/2003 | Molina et al. |
| 6,612,992 B1 | 9/2003 | Hossack et al. |
| 6,613,002 B1 | 9/2003 | Clark et al. |
| 6,687,386 B1 | 2/2004 | Ito et al. |
| 6,702,749 B2 | 3/2004 | Paladini et al. |
| 6,754,608 B2 | 6/2004 | Svanerudh et al. |
| 6,840,379 B2 | 1/2005 | Franks-Farah et al. |
| 6,857,196 B2 | 2/2005 | Dalrymple |
| 7,831,449 B2 | 11/2010 | Ying et al. |
| 9,521,961 B2 | 12/2016 | Silverstein et al. |
| 9,756,766 B2 | 9/2017 | Best |
| 9,949,720 B2 | 4/2018 | Southard et al. |
| 9,950,139 B2 | 4/2018 | Blanchard et al. |
| 10,849,689 B1 | 12/2020 | Hu et al. |
| 11,462,324 B1 * | 10/2022 | Roh .................. G16H 40/40 |
| 11,844,656 B2 | 12/2023 | Urabe et al. |
| 11,896,425 B2 | 2/2024 | Dhatt et al. |
| 11,974,813 B1 | 5/2024 | Donhowe et al. |
| 2003/0028112 A1 | 2/2003 | Paladini et al. |
| 2003/0047126 A1 | 3/2003 | Tomaschko |
| 2003/0106825 A1 | 6/2003 | Molina et al. |
| 2003/0120154 A1 | 6/2003 | Sauer et al. |
| 2003/0120155 A1 | 6/2003 | Sauer et al. |
| 2003/0199765 A1 | 10/2003 | Stetten et al. |
| 2004/0055925 A1 | 3/2004 | Franks-Farah et al. |
| 2005/0000975 A1 | 1/2005 | Carco et al. |
| 2005/0165299 A1 | 7/2005 | Kressy et al. |
| 2006/0004290 A1 | 1/2006 | Smith et al. |
| 2006/0015039 A1 | 1/2006 | Cassidy et al. |
| 2006/0020256 A1 | 1/2006 | Bell et al. |
| 2007/0043341 A1 | 2/2007 | Anderson et al. |
| 2007/0073155 A1 | 3/2007 | Park et al. |
| 2007/0199848 A1 | 8/2007 | Ellswood et al. |
| 2007/0239120 A1 | 10/2007 | Brock et al. |
| 2007/0249911 A1 | 10/2007 | Simon |
| 2007/0260213 A1 | 11/2007 | Williams et al. |
| 2008/0009747 A1 | 1/2008 | Saadat et al. |
| 2008/0033293 A1 | 2/2008 | Beasley et al. |
| 2008/0033759 A1 | 2/2008 | Finlay |
| 2008/0051657 A1 | 2/2008 | Rold |
| 2008/0058963 A1 | 3/2008 | Garibaldi et al. |
| 2008/0161687 A1 | 7/2008 | Suri et al. |
| 2008/0177186 A1 | 7/2008 | Slater et al. |
| 2008/0218743 A1 | 9/2008 | Stetten et al. |
| 2008/0300491 A1 | 12/2008 | Bonde et al. |
| 2009/0143672 A1 | 6/2009 | Harms et al. |
| 2009/0143684 A1 | 6/2009 | Cermak et al. |
| 2009/0156926 A1 | 6/2009 | Messerly et al. |
| 2009/0182224 A1 | 7/2009 | Shmarak et al. |
| 2009/0221908 A1 | 9/2009 | Glossop |
| 2009/0234328 A1 | 9/2009 | Cox et al. |
| 2009/0306509 A1 | 12/2009 | Pedersen et al. |
| 2010/0080427 A1 | 4/2010 | Yeluri et al. |
| 2010/0106015 A1 | 4/2010 | Norris |
| 2010/0106056 A1 | 4/2010 | Norris |
| 2010/0211026 A2 | 8/2010 | Sheetz et al. |
| 2010/0305442 A1 | 12/2010 | Tierney et al. |
| 2010/0312121 A1 | 12/2010 | Guan |
| 2011/0028847 A1 | 2/2011 | Whitmore, III et al. |
| 2011/0071404 A1 | 3/2011 | Schmitt et al. |
| 2011/0166451 A1 | 7/2011 | Blaivas et al. |
| 2011/0245659 A1 | 10/2011 | Ma et al. |
| 2011/0295108 A1 | 12/2011 | Cox et al. |
| 2011/0313293 A1 | 12/2011 | Lindekugel et al. |
| 2012/0078103 A1 | 3/2012 | Tashiro et al. |
| 2012/0143029 A1 | 6/2012 | Silverstein et al. |
| 2012/0165679 A1 | 6/2012 | Orome et al. |
| 2012/0197132 A1 | 8/2012 | O'Connor |
| 2012/0253200 A1 | 10/2012 | Stolka et al. |
| 2013/0006102 A1 | 1/2013 | Wilkes et al. |
| 2013/0102889 A1 | 4/2013 | Southard et al. |
| 2013/0131499 A1 | 5/2013 | Chan et al. |
| 2013/0218024 A1 | 8/2013 | Boctor et al. |
| 2013/0261553 A1 | 10/2013 | Sheldon et al. |
| 2014/0155744 A1 | 6/2014 | Pameijer |
| 2014/0275997 A1 | 9/2014 | Chopra et al. |
| 2014/0287393 A1 | 9/2014 | Kumar et al. |
| 2014/0303423 A1 | 10/2014 | Amthor et al. |
| 2014/0343406 A1 | 11/2014 | Damjanovic |
| 2015/0148668 A1 | 5/2015 | Stolka et al. |
| 2015/0182144 A1 | 7/2015 | Bharat et al. |
| 2015/0216442 A1 | 8/2015 | Lavy et al. |
| 2015/0250437 A1 | 9/2015 | Zaiki |
| 2015/0272553 A1 | 10/2015 | Thattari Kandiyil et al. |
| 2015/0320325 A1 | 11/2015 | Sheehan et al. |
| 2015/0320481 A1 | 11/2015 | Cosman, Jr. et al. |
| 2015/0359991 A1 | 12/2015 | Dunbar et al. |
| 2016/0051224 A1 | 2/2016 | Striano |
| 2016/0128719 A1 | 5/2016 | Cermak |
| 2016/0174937 A1 * | 6/2016 | Bakshi ................ A61B 8/4472 600/459 |
| 2016/0213398 A1 | 7/2016 | Liu |
| 2016/0300120 A1 | 10/2016 | Haas et al. |
| 2016/0302772 A1 | 10/2016 | Cummins et al. |
| 2016/0374644 A1 | 12/2016 | Mauldin, Jr. et al. |
| 2017/0035514 A1 | 2/2017 | Fox et al. |
| 2017/0056062 A1 | 3/2017 | Buljubasic |
| 2017/0079551 A1 | 3/2017 | Henkel et al. |
| 2017/0188990 A1 | 7/2017 | Von Allmen et al. |
| 2017/0245831 A1 | 8/2017 | Nishigaki et al. |
| 2017/0265946 A1 | 9/2017 | Ramachandran et al. |
| 2017/0290563 A1 | 10/2017 | Cole et al. |
| 2018/0015256 A1 | 1/2018 | Southard et al. |
| 2018/0036084 A1 | 2/2018 | Krimsky |
| 2018/0061546 A1 | 3/2018 | Ma et al. |
| 2018/0125450 A1 | 5/2018 | Blackbourne et al. |
| 2018/0132944 A1 | 5/2018 | Yan et al. |
| 2018/0228465 A1 | 8/2018 | Southard et al. |
| 2018/0289929 A1 | 10/2018 | Ma et al. |
| 2018/0310955 A1 | 11/2018 | Lindekugel et al. |
| 2019/0000478 A1 | 1/2019 | Messerly et al. |
| 2019/0026438 A1 | 1/2019 | Ma et al. |
| 2019/0105017 A1 | 4/2019 | Hastings |
| 2019/0282262 A1 | 9/2019 | Bouazza-Marouf et al. |
| 2019/0298278 A1 | 10/2019 | Nachabe et al. |
| 2019/0374290 A1 * | 12/2019 | Stolka .................. A61B 90/39 |
| 2020/0090331 A1 | 3/2020 | Mansi et al. |
| 2020/0113540 A1 | 4/2020 | Gijsbers et al. |
| 2020/0219258 A1 | 7/2020 | Saget et al. |
| 2020/0230391 A1 | 7/2020 | Burkholz et al. |
| 2020/0234812 A1 | 7/2020 | Willybiro et al. |
| 2020/0237403 A1 | 7/2020 | Southard et al. |
| 2020/0245969 A1 | 8/2020 | Tung et al. |
| 2020/0275949 A1 | 9/2020 | Masotti et al. |
| 2020/0297235 A1 | 9/2020 | Sanchez et al. |
| 2020/0315592 A1 | 10/2020 | Soleimani et al. |
| 2020/0359990 A1 | 11/2020 | Poland et al. |
| 2021/0015448 A1 | 1/2021 | Sokulin et al. |
| 2021/0045717 A1 | 2/2021 | Schwab |
| 2021/0059636 A1 | 3/2021 | Durfee et al. |
| 2021/0085282 A1 | 3/2021 | Prince |
| 2021/0138130 A1 | 5/2021 | Kotanko et al. |
| 2021/0169585 A1 | 6/2021 | Prince et al. |
| 2021/0186456 A1 | 6/2021 | Prince |
| 2021/0201080 A1 | 7/2021 | Kitahara |
| 2021/0275256 A1 | 9/2021 | Sowards et al. |
| 2021/0315542 A1 * | 10/2021 | Oura .................. G16H 30/40 |
| 2022/0013218 A1 | 1/2022 | Cousin |
| 2022/0022969 A1 | 1/2022 | Misener |
| 2022/0027257 A1 | 1/2022 | Harutyunyan et al. |
| 2022/0039685 A1 | 2/2022 | Misener et al. |
| 2022/0054869 A1 | 2/2022 | Stein et al. |
| 2022/0096797 A1 | 3/2022 | Prince |
| 2022/0101980 A1 | 3/2022 | Rothenberg et al. |
| 2022/0104886 A1 | 4/2022 | Blanchard et al. |

(56) References Cited

U.S. PATENT DOCUMENTS

| | | |
|---|---|---|
| 2022/0117582 A1 | 4/2022 | McLaughlin et al. |
| 2022/0142608 A1 | 5/2022 | Matsumoto |
| 2022/0160434 A1 | 5/2022 | Messerly et al. |
| 2022/0189610 A1 | 6/2022 | Long et al. |
| 2022/0230714 A1 | 7/2022 | Batman et al. |
| 2022/0241014 A1 | 8/2022 | Kleyman et al. |
| 2022/0280246 A1 | 9/2022 | Messerly et al. |
| 2022/0304652 A1 | 9/2022 | Peterson et al. |
| 2022/0392642 A1 | 12/2022 | Dasi et al. |
| 2022/0401157 A1 | 12/2022 | Sowards et al. |
| 2022/0406460 A1 | 12/2022 | Golan et al. |
| 2023/0030941 A1 | 2/2023 | Han |
| 2023/0121370 A1 | 4/2023 | Sowards et al. |
| 2023/0147164 A1 | 5/2023 | Sowards et al. |
| 2023/0225702 A1 | 7/2023 | Sakalauskas |
| 2023/0260107 A1 | 8/2023 | Dhatt et al. |
| 2023/0329748 A1 | 10/2023 | Sowards et al. |
| 2023/0338003 A1 | 10/2023 | Misener et al. |
| 2023/0380906 A1 | 11/2023 | Misener et al. |
| 2023/0404683 A1 | 12/2023 | Schmidt et al. |
| 2023/0420105 A1 | 12/2023 | Misener et al. |
| 2024/0008894 A1 | 1/2024 | Sowards et al. |
| 2024/0245386 A1 | 7/2024 | Prince |
| 2024/0274297 A1 | 8/2024 | Sillesen et al. |
| 2025/0000585 A1 | 1/2025 | Sinha et al. |

FOREIGN PATENT DOCUMENTS

| | | |
|---|---|---|
| CN | 216167530 U | 4/2022 |
| EP | 1504713 A1 | 2/2005 |
| EP | 0788329 B1 | 12/2006 |
| JP | 2018175547 A | 11/2018 |
| KR | 20180070878 A | 6/2018 |
| WO | 2013059714 A1 | 4/2013 |
| WO | 2014053934 A1 | 4/2014 |
| WO | 2015/017270 A1 | 2/2015 |
| WO | 2018/026878 A1 | 2/2018 |
| WO | 2019/232451 A1 | 12/2019 |
| WO | 2020/002620 A1 | 1/2020 |
| WO | 2020150501 A1 | 7/2020 |
| WO | 2020160550 A1 | 8/2020 |
| WO | 2020/186198 A1 | 9/2020 |
| WO | 2021113733 A1 | 6/2021 |
| WO | 2022/067101 A1 | 3/2022 |
| WO | 2022/072727 A2 | 4/2022 |
| WO | 2022/081904 A1 | 4/2022 |
| WO | 2022150411 A1 | 7/2022 |
| WO | 2022/187701 A1 | 9/2022 |
| WO | 2022212414 A1 | 10/2022 |
| WO | 2022271728 A1 | 12/2022 |
| WO | 2023064492 A1 | 4/2023 |
| WO | 2023081414 A1 | 5/2023 |
| WO | 2023091427 A1 | 5/2023 |
| WO | 2023205019 A1 | 10/2023 |
| WO | 2023205052 A1 | 10/2023 |
| WO | 2023230284 A1 | 11/2023 |
| WO | 2023244640 A1 | 12/2023 |
| WO | 2023250001 A1 | 12/2023 |
| WO | 2024010874 A1 | 1/2024 |

OTHER PUBLICATIONS

U.S. Appl. No. 17/724,371, filed Apr. 19, 2022 Non-Final Office Action dated Nov. 26, 2024.
U.S. Appl. No. 17/845,818, filed Jun. 21, 2022 Restriction Requirement dated Feb. 10, 2025.
U.S. Appl. No. 17/849,455, filed Jun. 24, 2022 Advisory Action dated Dec. 17, 2024.
U.S. Appl. No. 17/849,455, filed Jun. 24, 2022 Final Office Action dated Nov. 7, 2024.
U.S. Appl. No. 17/849,455, filed Jun. 24, 2022 Non-Final Office Action dated Jan. 24, 2025.
U.S. Appl. No. 17/859,980, filed Jul. 7, 2022 Advisory Action dated Feb. 10, 2025.
U.S. Appl. No. 17/859,980, filed Jul. 7, 2022 Final Office Action dated Dec. 5, 2024.
U.S. Appl. No. 17/965,657, filed Oct. 13, 2022 Non-Final Office Action dated Jan. 6, 2025.
U.S. Appl. No. 18/601,980, filed Mar. 11, 2024 Notice of Allowance dated Jan. 10, 2025.
Beigi, P. et al., "Enhancement of needle visualization and localization in ultrasound." International Journal of Computer Assisted Radiology and Surgery, vol. 16, No. 130, Sep. 2020 [Sep. 30, 2020] pp. 169-178.
PCT/US2023/018340 filed Apr. 12, 2023 International Seach Report and Written Opinion dated Jul. 20, 2023.
PCT/US2023/018680 filed Apr. 14, 2023 International Seach Report and Written Opinion dated Aug. 11, 2013.
PCT/US2023/023616 filed May 25, 2023 International Search Report and Written Opinion dated Aug. 16, 2023.
U.S. Appl. No. 17/725,370, filed Apr. 20, 2022 Non-Final Office Action dated Aug. 4, 2023.
U.S. Appl. No. 17/687,476, filed Mar. 4, 2022 Non-Final Office Action dated Nov. 1, 2024.
U.S. Appl. No. 17/707,662, filed Mar. 29, 2022 Examiner's Answer dated Oct. 23, 2024.
U.S. Appl. No. 17/724,371, filed Apr. 19, 2022 Advisory Action dated Sep. 20, 2024.
U.S. Appl. No. 17/725,370, filed Apr. 20, 2022 Notice of Allowance dated Sep. 18, 2024.
U.S. Appl. No. 17/825,976, filed May 26, 2022 Non-Final Office Action dated Oct. 4, 2024.
U.S. Appl. No. 17/981,313, filed Nov. 4, 2022 Non-Final Office Action dated Oct. 8, 2024.
U.S. Appl. No. 18/601,980, filed Mar. 11, 2024 Non-Final Office Action dated Sep. 27, 2024.
Murphy, Ethan K., et al., "Phantom Studies of Fused-Data TREIT Using Only Biopsy-Probe Electrodes" IEEE Transactions on Medical Imaging, IEEE, USA. vol. 39 No. 114, May 2020. (May 4, 2020).
PCT/US2012/061182 International Seach Report and Written Opinion dated Mar. 11, 2013.
PCT/US2020/063441 filed Dec. 4, 2020 International Preliminary Report on Patentability dated May 17, 2022.
PCT/US2020/063441 filed Dec. 4, 2020 International Search Report and Written Opinion dated Mar. 19, 2021.
PCT/US2021/052055 filed Sep. 24, 2021 International Search Report and Written Opinion dated Dec. 20, 2021.
PCT/US2022/019017 filed Mar. 4, 2022 International Search Report and Written Opinion dated Jun. 14, 2022.
PCT/US2022/022400 filed Mar. 29, 2022 International Search Report and Written Opinion dated Jul. 8, 2022.
PCT/US2022/034380 filed Jun. 21, 2022 International Search Report and Written Opinion dated Oct. 5, 2022.
Sebastian Vogt: "Real-Time Augmented Reality for Image-Guided Interventions", Oct. 5, 2009, XPO55354720, Retrieved from the Internet: URL: https://opus4.kobv.de/opus4-fau/frontdoor/deliver/index/docId/1235/file/SebastianVogtDissertation.pdf.
U.S. Appl. No. 13/656,563, filed Oct. 19, 2012 Decision on Appeal dated Nov. 1, 2017.
U.S. Appl. No. 13/656,563, filed Oct. 19, 2012 Examiner's Answer dated Nov. 16, 2015.
U.S. Appl. No. 13/656,563, filed Oct. 19, 2012 Final Office Action dated Dec. 5, 2014.
U.S. Appl. No. 13/656,563, filed Oct. 19, 2012 Non-Final Office Action dated Jul. 18, 2014.
U.S. Appl. No. 15/951,903, filed Apr. 12, 2018 Advisory Action dated Dec. 22, 2020.
U.S. Appl. No. 15/951,903, filed Apr. 12, 2018 Board Decision dated Apr. 20, 2022.
U.S. Appl. No. 15/951,903, filed Apr. 12, 2018 Examiner's Answer dated Jun. 3, 2021.
U.S. Appl. No. 15/951,903, filed Apr. 12, 2018 Final Office Action dated Oct. 13, 2020.

(56) References Cited

OTHER PUBLICATIONS

U.S. Appl. No. 15/951,903, filed Apr. 12, 2018 Non-Final Office Action dated May 22, 2020.
U.S. Appl. No. 15/951,903, filed Apr. 12, 2018 Notice of Allowance dated May 2, 2022.
U.S. Appl. No. 17/112,735, filed Dec. 4, 2022 Non-Final Office Action dated Oct. 26, 2022.
William F Garrett et al: "Real-time incremental visualization of dynamic ultrasound volumes using parallel BSP trees", Visualization '96. Proceedings, IEEE, NE, Oct. 27, 1996, pp. 235-ff, XPO58399771, ISBN: 978-0-89791-864-0 abstract, figures 1-7, pp. 236-240.
PCT/US2022/046606 filed Oct. 13, 2022 International Search Report and Written Opinion dated Feb. 6, 2023.
PCT/US2022/049042 filed Nov. 4, 2022 International Search Report and Written Opinion dated Mar. 1, 2023.
PCT/US2022/049989 filed Nov. 15, 2022 International Search Report and Written Opinion dated Feb. 6, 2023.
U.S. Appl. No. 17/112,725, filed Dec. 4, 2020 Final Office Action dated Apr. 14, 2023.
U.S. Appl. No. 17/485,035, filed Sep. 24, 2021 Non-Final Office Action dated May 3, 2023.
U.S. Appl. No. 17/725,370, filed Apr. 20, 2022 Restriction Requirement dated Apr. 27, 2023.
U.S. Appl. No. 17/707,662, filed Mar. 29, 2022 Advisory Action dated Feb. 23, 2024.
U.S. Appl. No. 17/707,662, filed Mar. 29, 2022 Final Office Action dated Apr. 22, 2024.
U.S. Appl. No. 17/707,662, filed Mar. 29, 2022 Final Office Action dated Dec. 20, 2023.
U.S. Appl. No. 17/724,371, filed Apr. 19, 2022 Final Office Action dated Jul. 24, 2024.
U.S. Appl. No. 17/724,371, filed Apr. 19, 2022 Non-Final Office Action dated Apr. 12, 2024.
U.S. Appl. No. 17/725,370, filed Apr. 20, 2022 Final Office Action dated Feb. 15, 2024.
U.S. Appl. No. 17/825,976, filed May 26, 2022 Restriction Requirement dated Apr. 12, 2024.
U.S. Appl. No. 17/849,455, filed Jun. 24, 2022 Non-Final Office Action dated Jul. 18, 2024.
U.S. Appl. No. 17/859,980, filed Jul. 7, 2022 Non-Final Office Action dated Jul. 1, 2024.
PCT/US2023/025259 filed Jun. 14, 2023 International Search Report and Written Opinion dated Sep. 25, 2023.
PCT/US2023/025845 filed Jun. 21, 2023 International Search Report and Written Opinion dated Sep. 26, 2023.
PCT/US2023/027042 filed Jul. 6, 2023 International Search Report and Written Opinion dated Oct. 10, 2023.
Schmidt G A et al Ultrasound-guided 1-22 vascular access in critical illness Intensive Care Medicine Springer Berlin Heidelberg Berlin/Heidelberg vol. 45 No. 4 Feb. 18, 2019 Feb. 18, 2019 pp. 434-446 XP036747615 ISSN 0342-4642 DOI 10.1007/S00134-019-05564-7 retrieved on 2019-02-181.
U.S. Appl. No. 17/485,035, filed Sep. 24, 2021 Notice of Allowance dated Nov. 8, 2023.
U.S. Appl. No. 17/707,662, filed Mar. 29, 2022 Non-Final Office Action dated Oct. 17, 2023.
U.S. Appl. No. 17/687,476, filed Mar. 4, 2022 Notice of Allowance dated Mar. 5, 2025.
U.S. Appl. No. 17/724,371, filed Apr. 19, 2022 Advisory Action dated May 14, 2025.
U.S. Appl. No. 17/724,371, filed Apr. 19, 2022 Final Office Action dated Mar. 7, 2025.
U.S. Appl. No. 17/724,371, filed Apr. 19, 2022 Non-Final Office Action dated Jun. 12, 2025.
U.S. Appl. No. 17/825,976, filed May 26, 2022 Advisory Action dated Jun. 9, 2025.
U.S. Appl. No. 17/825,976, filed May 26, 2022 Final Office Action dated Mar. 25, 2025.
U.S. Appl. No. 17/841,541, filed Jun. 15, 2022 Non-Final Office Action dated Mar. 14, 2025.
U.S. Appl. No. 17/845,818, filed Jun. 21, 2022 Non-Final Office Action dated Jun. 17, 2025.
U.S. Appl. No. 17/849,455, filed Jun. 24, 2022 Final Office Action dated May 7, 2025.
U.S. Appl. No. 17/859,980, filed Jul. 7, 2022 Non-Final Office Action dated May 29, 2025.
U.S. Appl. No. 17/965,657, filed Oct. 13, 2022 Final Office Action dated May 22, 2025.
U.S. Appl. No. 17/981,313, filed Nov. 4, 2022 Final Office Action dated Apr. 15, 2025.
U.S. Appl. No. 17/825,976, filed May 26, 2022 Non-Final Office Action dated Aug. 5, 2025.
U.S. Appl. No. 17/841,541, filed Jun. 15, 2022 Final Office Action dated Jul. 23, 2025.
U.S. Appl. No. 17/849,455, filed Jun. 24, 2022 Advisory Action dated Jul. 11, 2025.
U.S. Appl. No. 17/981,313, filed Nov. 4, 2022 Advisory Action dated Jun. 26, 2025.
U.S. Appl. No. 17/981,313, filed Nov. 4, 2022 Non-Final Office Action dated Jul. 22, 2025.

* cited by examiner

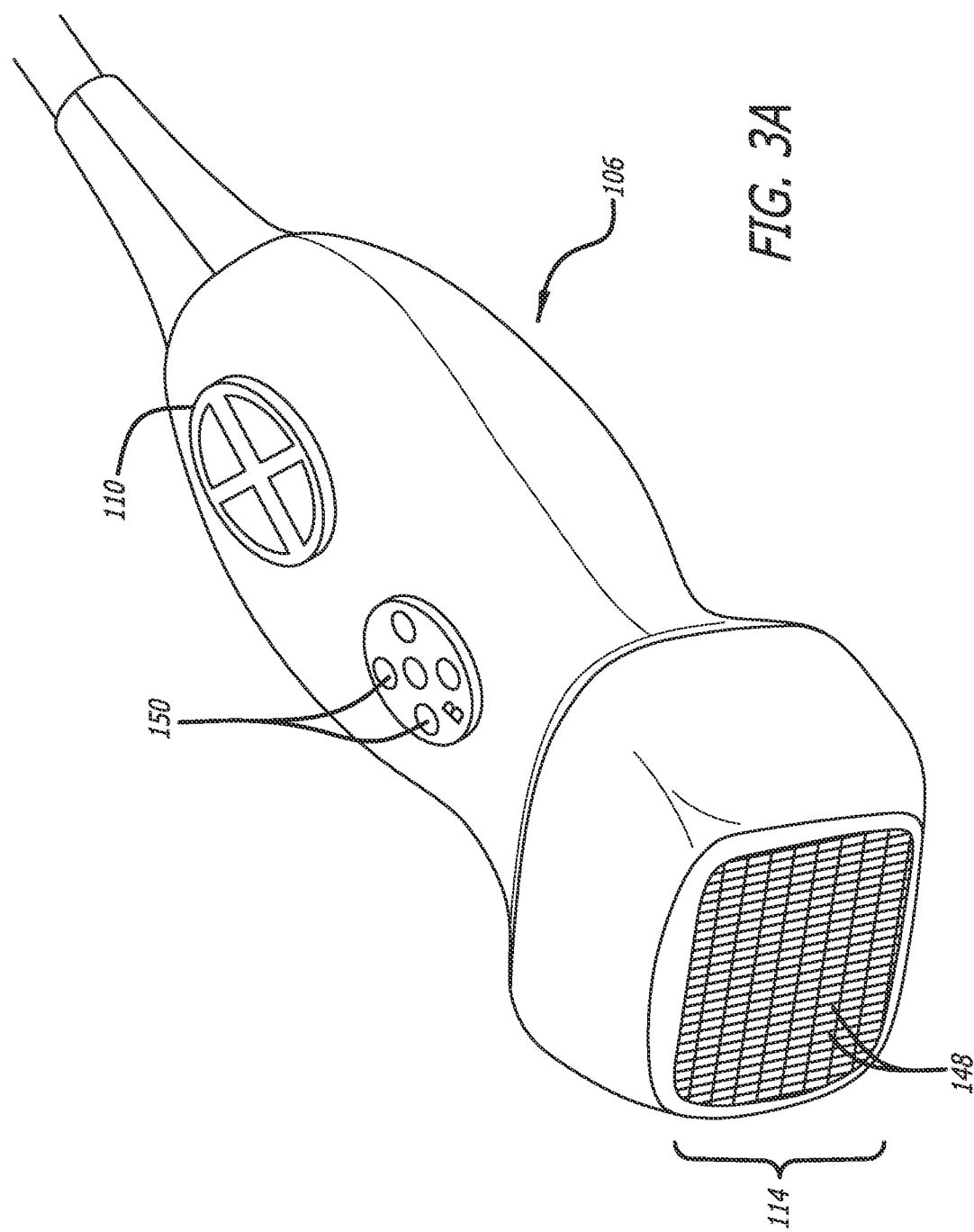

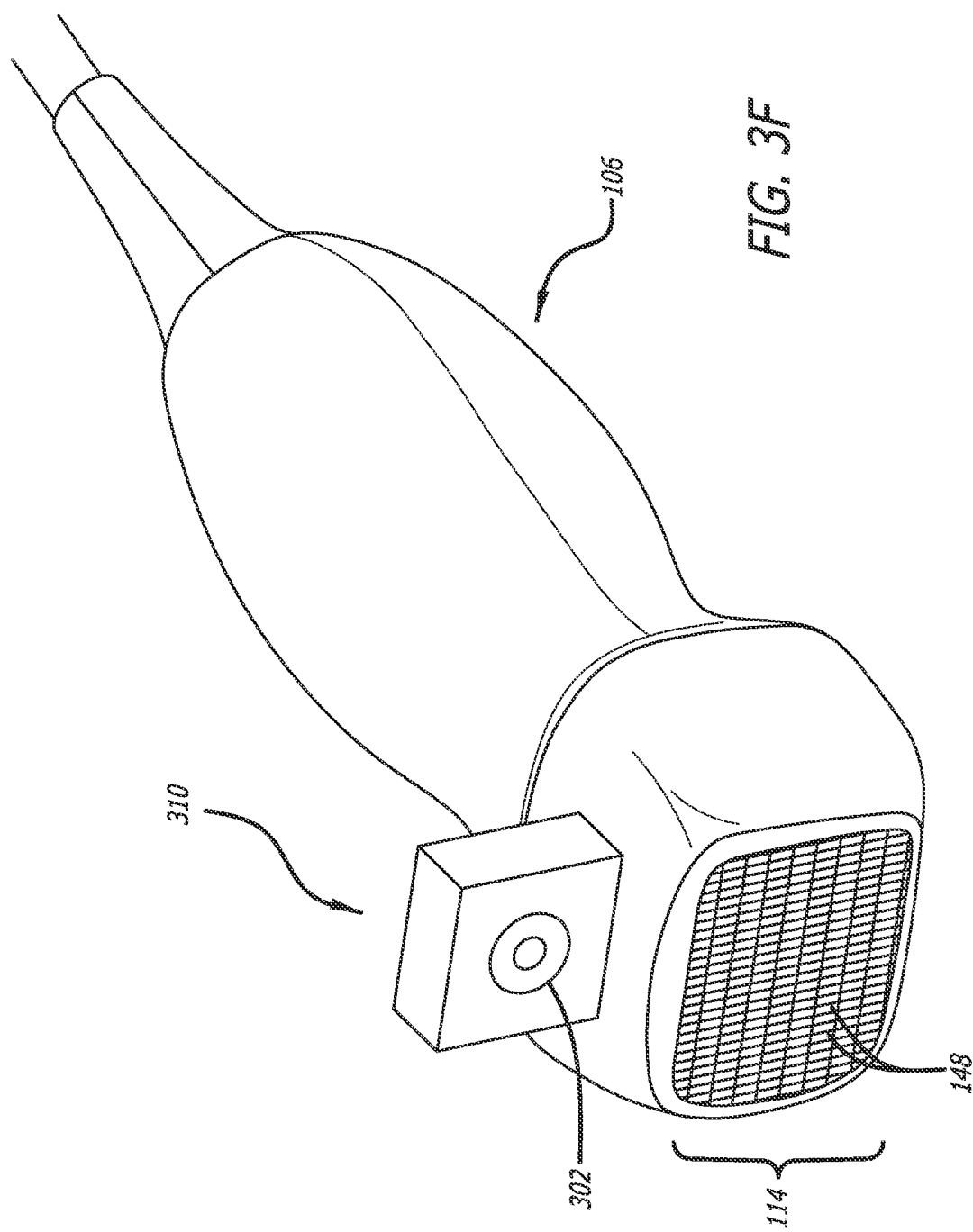

ULTRASOUND PROBE WITH INTEGRATED DATA COLLECTION METHODOLOGIES

PRIORITY

This application claims the benefit of priority to U.S. Provisional Application No. 63/280,047, filed Nov. 16, 2021, which is incorporated in its entirety into this application.

BACKGROUND

Ultrasound imaging is a widely accepted tool for guiding interventional instruments such as needles to targets such as blood vessels or organs in the human body. In order to successfully guide, for example, a needle to a blood vessel using ultrasound imaging, the needle is monitored in real-time both immediately before and after a percutaneous puncture in order to enable a clinician to determine the distance and the orientation of the needle to the blood vessel and ensure successful access thereto. However, through inadvertent movement of an ultrasound probe during the ultrasound imaging, the clinician can lose both the blood vessel and the needle, which can be difficult and time consuming to find again. In addition, it is often easier to monitor the distance and orientation of the needle immediately before the percutaneous puncture with a needle plane including the needle perpendicular to an image plane of the ultrasound probe. And it is often easier to monitor the distance and orientation of the needle immediately after the percutaneous puncture with the needle plane parallel to the image plane. As with inadvertently moving the ultrasound probe, the clinician can lose both the blood vessel and the needle when adjusting the image plane before and after the percutaneous puncture, which can be difficult and time consuming to find again. What is needed are ultrasound-imaging systems and methods thereof that can dynamically adjust the image plane to facilitate guiding interventional instruments to targets in at least the human body.

Doppler ultrasound is a noninvasive approach to estimating the blood flow through your blood vessels by bouncing high-frequency sound waves (ultrasound) off circulating red blood cells. A doppler ultrasound can estimate how fast blood flows by measuring the rate of change in its pitch (frequency). Doppler ultrasound may be performed as an alternative to more-invasive procedures, such as angiography, which involves injecting dye into the blood vessels so that they show up clearly on X-ray images. Doppler ultrasound may help diagnose many conditions, including blood clots, poorly functioning valves in your leg veins, which can cause blood or other fluids to pool in your legs (venous insufficiency), heart valve defects and congenital heart disease, a blocked artery (arterial occlusion), decreased blood circulation into your legs (peripheral artery disease), bulging arteries (aneurysms), and narrowing of an artery, such as in your neck (carotid artery stenosis). Doppler ultrasound may also detect a direction of blood flow within a blood vessel.

Disclosed herein are systems including ultrasound imaging probes having integrated therein one or more scanning components, which enable ultrasound scanning and ancillary scanning such as via a barcode scanner, a camera, and/or a radio-frequency identifier (RFID) scanner with a single ultrasound imaging probe. Additionally, disclosed herein are methods of use of such ultrasound imaging probes.

SUMMARY

Disclosed herein is an ultrasound-imaging system including, in some embodiments, an ultrasound probe including (i) an array of ultrasonic transducers, activated ultrasonic transducers of the array of ultrasonic transducers configured to emit generated ultrasound signals into a patient, receive reflected ultrasound signals from the patient, and convert the reflected ultrasound signals into corresponding electrical signals of the ultrasound signals for processing into an ultrasound image, and (ii) a secondary data collection module, a console configured to communicate with the ultrasound probe, the console including one or more processors and a non-transitory computer-readable medium having stored thereon logic, when executed by the one or more processors, causes operations including: receiving and processing the electrical signals to generate the ultrasound image, receiving secondary data from the secondary data collection module, wherein the secondary data is data other than the electrical signals corresponding to reflected ultrasound signals, and providing a notification to administrator that includes the secondary data.

In some embodiments, the secondary data collection module includes a barcode scanner and the secondary data includes barcode data. In further embodiments, the barcode data identifies one of a patient, a clinician, or a medical device, and wherein the notification includes information corresponding to the patient, the clinician, or the medical device. In other embodiments, the secondary data collection module includes a camera and the secondary data includes image data. In some embodiments, the image data includes a medical device, a packaging of the medical device, a patient identifier, a clinician identifier, or an insertion site of a patient. In yet other embodiments, the image data includes a video capturing insertion of a medical device into a patient. Further, the notification may be a display rendered on a display screen of the console, wherein the display includes the ultrasound image and information corresponding to the secondary data of at least one of (i) patient information, or (ii) medical device information. In some embodiments, the secondary data collection module includes a radio-frequency identifier (RFID) sensor and the secondary data includes RFID data.

Also disclosed herein is an ultrasound probe apparatus including an array of ultrasonic transducers, activated ultrasonic transducers of the array of ultrasonic transducers configured to emit generated ultrasound signals into a patient, receive reflected ultrasound signals from the patient, and convert the reflected ultrasound signals into corresponding electrical signals of the ultrasound signals for processing into an ultrasound image and a secondary data collection module configured to collect secondary data that is different than the electrical signals corresponding to reflected ultrasound signals.

Additionally, disclosed herein is a method of utilizing an ultrasound-imaging system including a non-transitory computer-readable medium having executable instructions that cause the ultrasound-imaging system to perform a set of operations for ultrasound imaging when the instructions are executed by a processor of a console of the ultrasound-imaging system, the method comprising activating ultrasonic transducers of an array of ultrasonic transducers of an ultrasound probe communicatively coupled to the console, whereby the ultrasonic transducers emit generated ultrasound signals into a patient, receive reflected ultrasound signals from the patient, and convert the reflected ultrasound signals into corresponding electrical signals of the ultrasound signals for processing into ultrasound images, activating a secondary data collection module of the ultrasound probe, the secondary data collection module configured to collect secondary data that is different than the electrical signals corresponding to reflected ultrasound signals, receiving and processing the electrical signals to generate the ultrasound image, receiving secondary data from the secondary data collection module, wherein the secondary data is data other than the electrical signals corresponding to reflected ultrasound signals, and providing a notification to administrator that includes the secondary data.

These and other features of the concepts provided herein will become more apparent to those of skill in the art in view of the accompanying drawings and following description, which describe particular embodiments of such concepts in greater detail.

DRAWINGS

FIG. 3A illustrates a first embodiment of an ultrasound probe that may be included in the ultrasound-imaging system of FIG. 1 in accordance with some embodiments.

FIG. 3F illustrates a sixth embodiment of an ultrasound probe that may be included in the ultrasound-imaging system of FIG. 1 in accordance with some embodiments.

DESCRIPTION

Figure 1:
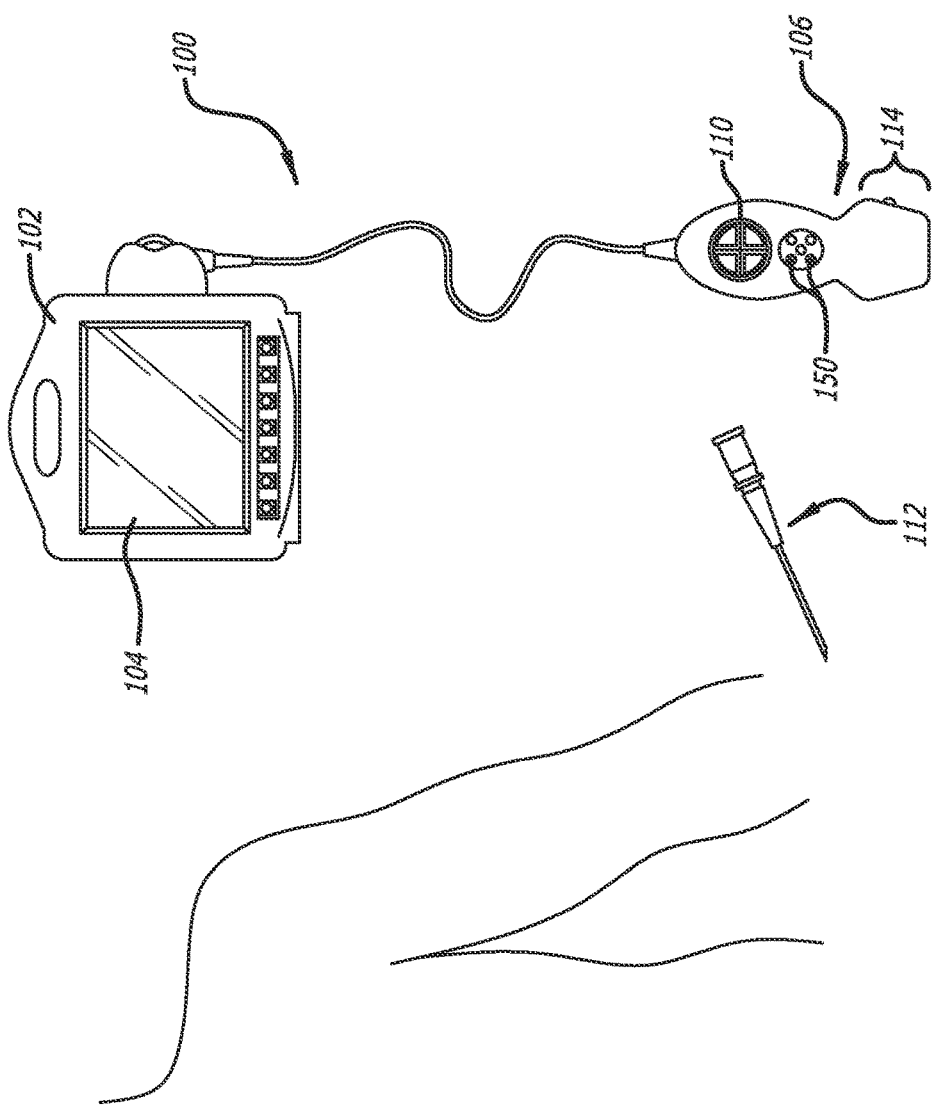
FIG. 1 illustrates an ultrasound-imaging system and a patient in accordance with some embodiments.
Figure 1:
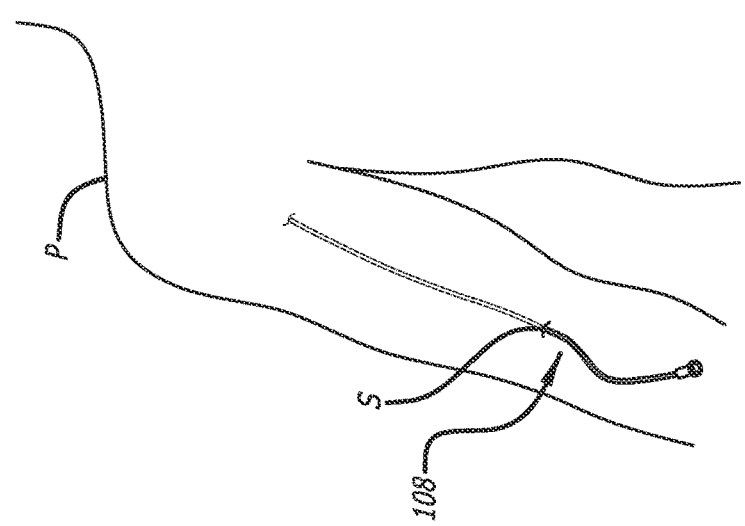

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

With respect to "proximal," a "proximal portion" or a "proximal-end portion" of, for example, a catheter disclosed herein includes a portion of the catheter intended to be near a clinician when the catheter is used on a patient. Likewise, a "proximal length" of, for example, the catheter includes a length of the catheter intended to be near the clinician when the catheter is used on the patient. A "proximal end" of, for example, the catheter includes an end of the catheter intended to be near the clinician when the catheter is used on the patient. The proximal portion, the proximal-end portion, or the proximal length of the catheter can include the proximal end of the catheter; however, the proximal portion, the proximal-end portion, or the proximal length of the catheter need not include the proximal end of the catheter. That is, unless context suggests otherwise, the proximal portion, the proximal-end portion, or the proximal length of the catheter is not a terminal portion or terminal length of the catheter.

With respect to "distal," a "distal portion" or a "distal-end portion" of, for example, a catheter disclosed herein includes a portion of the catheter intended to be near or in a patient when the catheter is used on the patient. Likewise, a "distal length" of, for example, the catheter includes a length of the catheter intended to be near or in the patient when the catheter is used on the patient. A "distal end" of, for example, the catheter includes an end of the catheter intended to be near or in the patient when the catheter is used on the patient. The distal portion, the distal-end portion, or the distal length of the catheter can include the distal end of the catheter; however, the distal portion, the distal-end portion, or the distal length of the catheter need not include the distal end of the catheter. That is, unless context suggests otherwise, the distal portion, the distal-end portion, or the distal length of the catheter is not a terminal portion or terminal length of the catheter.

Unless defined otherwise, all technical and scientific terms used herein have the same meaning as commonly understood by those of ordinary skill in the art.

As set forth above, ultrasound-imaging systems and methods thereof are needed that can dynamically adjust the image plane to facilitate guiding interventional instruments to targets in at least the human body. Disclosed herein are dynamically adjusting ultrasound-imaging systems and methods thereof.

Figure 2:
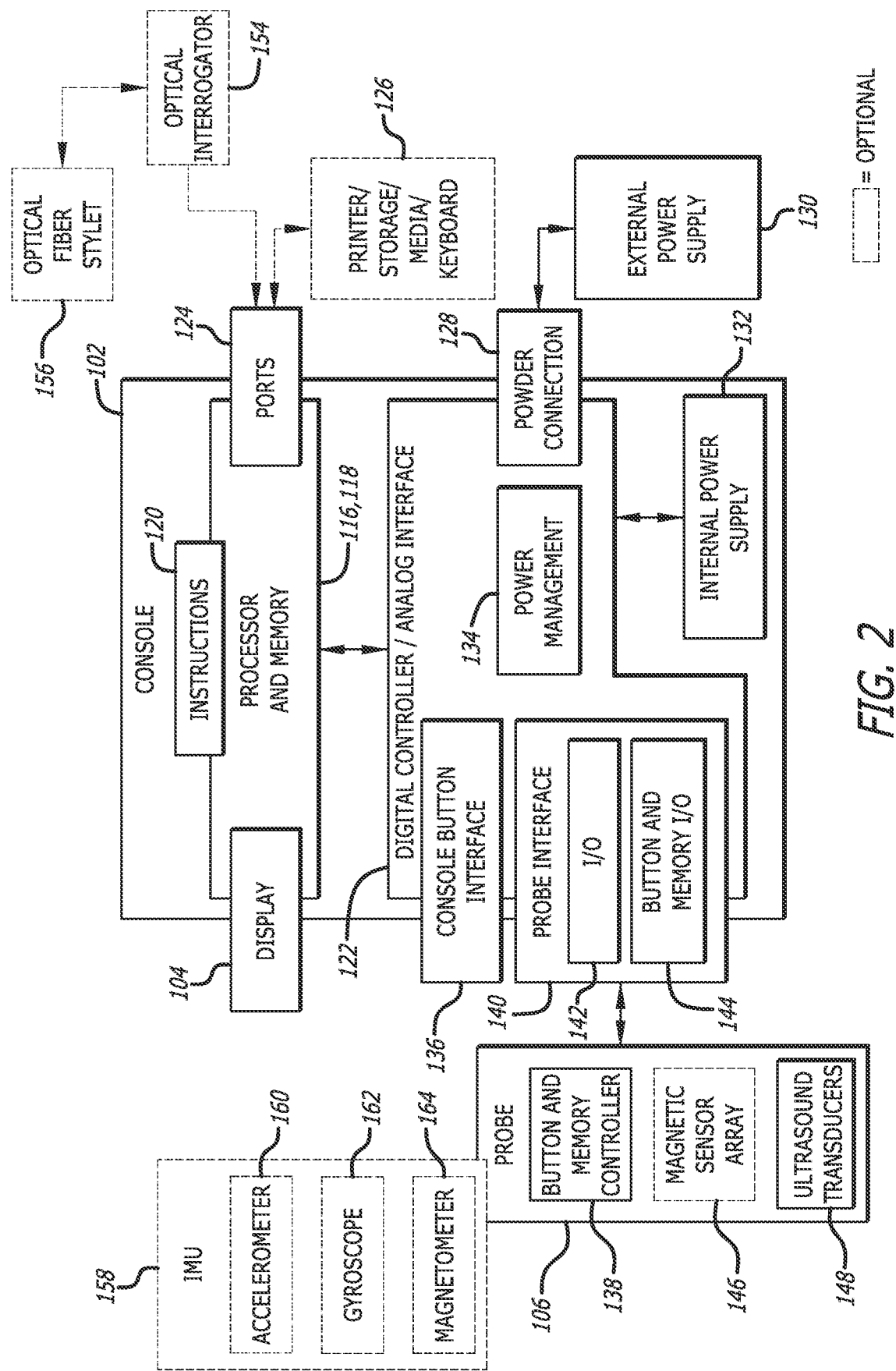
FIG. 2 illustrates a block diagram of a console of the ultrasound-imaging system of FIG. 1 in accordance with some embodiments.

Referring now to FIG. 1, an illustration of an ultrasound-imaging system 100, a needle 112, and a patient P is shown in accordance with some embodiments. FIG. 2 illustrates a block diagram of the ultrasound-imaging system 100 in accordance with some embodiments. FIG. 3A illustrates an ultrasound probe 106 of the ultrasound-imaging system 100 imaging a blood vessel of the patient P prior to accessing the blood vessel in accordance with some embodiments.

As shown, the ultrasound-imaging system 100 includes a console 102, the display screen 104, and the ultrasound probe 106. The ultrasound-imaging system 100 is useful for imaging a target such as a blood vessel or an organ within a body of the patient P prior to a percutaneous puncture with the needle 112 for inserting the needle 112 or another medical device into the target and accessing the target.

Indeed, the ultrasound-imaging system 100 is shown in FIG. 1 in a general relationship to the patient P during an ultrasound-based medical procedure to place a catheter 108 into the vasculature of the patient P through a skin insertion site S created by a percutaneous puncture with the needle 112. It should be appreciated that the ultrasound-imaging system 100 can be useful in a variety of ultrasound-based medical procedures other than catheterization. For example, the percutaneous puncture with the needle 112 can be performed to biopsy tissue of an organ of the patient P.

The console 102 houses a variety of components of the ultrasound-imaging system 100, and it is appreciated the console 102 can take any of a variety of forms. A processor 116 and memory 118 such as random-access memory ("RAM") or non-volatile memory (e.g., electrically erasable programmable read-only memory ("EEPROM")) is included in the console 102 for controlling functions of the ultrasound-imaging system 100, as well as executing various logic operations or algorithms during operation of the ultrasound-imaging system 100 in accordance with executable logic 120 therefor stored in the memory 118 for execution by the processor 116. For example, the console 102 is configured to instantiate by way of the logic 120 one or more processes for dynamically adjusting a distance of activated ultrasonic transducers 149 from a predefined target (e.g., blood vessel) or area, an orientation of the activated ultrasonic transducers 149 to the predefined target or area, or both the distance and the orientation of the activated ultrasonic transducers 149 with respect to the predefined target or area, as well as process electrical signals from the ultrasound probe 106 into ultrasound images. Dynamically adjusting the activated ultrasonic transducers 149 uses ultrasound-imaging data, magnetic-field data, shape-sensing data, or a combination thereof received by the console 102 for activating certain ultrasonic transducers of a 2-D array of the ultrasonic transducers 148 or moving those already activated in a linear array of the ultrasonic transducers 148. A digital controller/analog interface 122 is also included with the console 102 and is in communication with both the processor 116 and other system components to govern interfacing between the ultrasound probe 106 and other system components set forth herein.

The ultrasound-imaging system 100 further includes ports 124 for connection with additional components such as optional components 126 including a printer, storage media, keyboard, etc. The ports 124 can be universal serial bus ("USB") ports, though other types of ports can be used for this connection or any other connections shown or described herein. A power connection 128 is included with the console 102 to enable operable connection to an external power supply 130. An internal power supply 132 (e.g., a battery) can also be employed either with or exclusive of the external power supply 130. Power management circuitry 134 is included with the digital controller/analog interface 122 of the console 102 to regulate power use and distribution.

The display screen 104 is integrated into the console 102 to provide a GUI and display information for a clinician during such as one-or-more ultrasound images of the target or the patient P attained by the ultrasound probe 106. In addition, the ultrasound-imaging system 100 enables the distance and orientation of a magnetized medical device such as the needle 112 to be superimposed in real-time atop an ultrasound image of the target, thus enabling a clinician to accurately guide the magnetized medical device to the intended target. Notwithstanding the foregoing, the display screen 104 can alternatively be separate from the console 102 and communicatively coupled thereto. A console button interface 136 and control buttons 110 (see FIG. 1) included on the ultrasound probe 106 can be used to immediately call up a desired mode to the display screen 104 by the clinician for assistance in an ultrasound-based medical procedure. In some embodiments, the display screen 104 is an LCD device.

The ultrasound probe 106 is employed in connection with ultrasound-based visualization of a target such as a blood vessel (see FIG. 3A) in preparation for inserting the needle 112 or another medical device into the target. Such visualization gives real-time ultrasound guidance and assists in reducing complications typically associated with such insertion, including inadvertent arterial puncture, hematoma, pneumothorax, etc. As described in more detail below, the ultrasound probe 106 is configured to provide to the console 102 electrical signals corresponding to both the ultrasound-imaging data, the magnetic-field data, the shape-sensing data, or a combination thereof for the real-time ultrasound guidance.

Optionally, a stand-alone optical interrogator 154 can be communicatively coupled to the console 102 by way of one of the ports 124. Alternatively, the console 102 can include an integrated optical interrogator integrated into the console 102. Such an optical interrogator is configured to emit input optical signals into a companion optical-fiber stylet 156 for shape sensing with the ultrasound-imaging system 100, which optical-fiber stylet 156, in turn, is configured to be inserted into a lumen of a medical device such as the needle 112 and convey the input optical signals from the optical interrogator 154 to a number of FBG sensors along a length of the optical-fiber stylet 156. The optical interrogator 154 is also configured to receive reflected optical signals conveyed by the optical-fiber stylet 156 reflected from the number of FBG sensors, the reflected optical signals indicative of a shape of the optical-fiber stylet 156. The optical interrogator 154 is also configured to convert the reflected optical signals into corresponding electrical signals for processing by the console 102 into distance and orientation information with respect to the target for dynamically adjusting a distance of the activated ultrasonic transducers 149, an orientation of the activated ultrasonic transducers 149, or both the distance and the orientation of the activated ultrasonic transducers 149 with respect to the target or the medical device when it is brought into proximity of the target. For example, the distance and orientation of the activated ultrasonic transducers 149 can be adjusted with respect to a blood vessel as the target. Indeed, an image plane can be established by the activated ultrasonic transducers 149 being perpendicular or parallel to the blood vessel in accordance with an orientation of the blood vessel. In another example, when a medical device such as the needle 112 is brought into proximity of the ultrasound probe 106, an image plane can be established by the activated ultrasonic transducers 149 being perpendicular to a medical-device plane including the medical device as shown in FIGS. 11-13 and 21-23 or parallel to the medical-device plane including the medical device for accessing the target with the medical device. The image plane can be perpendicular to the medical-device plane upon approach of the medical device and parallel to the medical-device plane upon insertion of the medical device (e.g., percutaneous puncture with the needle 112). The distance and orientation information can also be used for displaying an iconographic representation of the medical device on the display.

FIG. 2 shows that the ultrasound probe 106 further includes a button and memory controller 138 for governing button and ultrasound probe 106 operation. The button and memory controller 138 can include non-volatile memory (e.g., EEPROM). The button and memory controller 138 is in operable communication with a probe interface 140 of the console 102, which includes an input/output ("I/O") component 142 for interfacing with the ultrasonic transducers 148 and a button and memory I/O component 144 for interfacing with the button and memory controller 138.

The ultrasound probe 106 can include a magnetic-sensor array 146 for detecting a magnetized medical device such as the needle 112 during ultrasound-based medical procedures. The magnetic-sensor array 146 includes a number of magnetic sensors 150 embedded within or included on a housing of the ultrasound probe 106. The magnetic sensors 150 are configured to detect a magnetic field or a disturbance in a magnetic field as magnetic signals associated with the magnetized medical device when it is in proximity to the magnetic-sensor array 146. The magnetic sensors 150 are also configured to convert the magnetic signals from the magnetized medical device (e.g., the needle 112) into electrical signals for the console 102 to process into distance and orientation information for the magnetized medical device with respect to the predefined target, as well as for display of an iconographic representation of the magnetized medical device on the display screen 104. (See the magnetic field B of the needle 112 in FIGS. 3A-3C.) Thus, the magnetic-sensor array 146 enables the ultrasound-imaging system 100 to track the needle 112 or the like.

Though configured here as magnetic sensors, it is appreciated that the magnetic sensors 150 can be sensors of other types and configurations. Also, though they are described herein as included with the ultrasound probe 106, the magnetic sensors 150 of the magnetic-sensor array 146 can be included in a component separate from the ultrasound probe 106 such as a sleeve into which the ultrasound probe 106 is inserted or even a separate handheld device. The magnetic sensors 150 can be disposed in an annular configuration about the probe head 114 of the ultrasound probe 106, though it is appreciated that the magnetic sensors 150 can be arranged in other configurations, such as in an arched, planar, or semi-circular arrangement.

Each magnetic sensor of the magnetic sensors 150 includes three orthogonal sensor coils for enabling detection of a magnetic field in three spatial dimensions. Such 3-dimensional ("3-D") magnetic sensors can be purchased, for example, from Honeywell Sensing and Control of Morristown, NJ. Further, the magnetic sensors 150 are configured as Hall-effect sensors, though other types of magnetic sensors could be employed. Further, instead of 3-D sensors, a plurality of 1-dimensional ("1-D") magnetic sensors can be included and arranged as desired to achieve 1-, 2-, or 3-D detection capability.

Five magnetic sensors 150 are included in the magnetic-sensor array 146 so as to enable detection of a magnetized medical device such as the needle 112 in three spatial dimensions (e.g., X, Y, Z coordinate space), as well as the pitch and yaw orientation of the magnetized medical device itself. Detection of the magnetized medical device in accordance with the foregoing when the magnetized medical device is brought into proximity of the ultrasound probe 106 allows for dynamically adjusting a distance of the activated ultrasonic transducers 149, an orientation of the activated ultrasonic transducers 149, or both the distance and the orientation of the activated ultrasonic transducers 149 with respect to the target or the magnetized medical device. For example, the distance and orientation of the activated ultrasonic transducers 149 can be adjusted with respect to a blood vessel as the target. Indeed, an image plane can be established by the activated ultrasonic transducers 149 being perpendicular or parallel to the blood vessel in accordance with an orientation of the blood vessel. In other embodiments, fewer than five or more than five magnetic sensors of the magnetic sensors 150 can be employed in the magnetic-sensor array 146. More generally, it is appreciated that the number, size, type, and placement of the magnetic sensors 150 of the magnetic-sensor array 146 can vary from what is explicitly shown here.

As shown in FIG. 2, the ultrasound probe 106 can further include an inertial measurement unit ("IMU") 158 or any one or more components thereof for inertial measurement selected from an accelerometer 160, a gyroscope 162, and a magnetometer 164 configured to provide positional-tracking data of the ultrasound probe 106 to the console 102 for stabilization of an image plane. The processor 116 is further configured to execute the logic 120 for processing the positional-tracking data for adjusting the distance of the activated ultrasonic transducers 149 from the target, the orientation of the activated ultrasonic transducers 149 to the target, or both the distance and the orientation of the activated ultrasonic transducers 149 with respect to the target to maintain the distance and the orientation of the activated ultrasonic transducers 149 with respect to the target when the ultrasound probe 106 is inadvertently moved with respect to the target.

It is appreciated that a medical device of a magnetizable material enables the medical device (e.g., the needle 112) to be magnetized by a magnetizer, if not already magnetized, and tracked by the ultrasound-imaging system 100 when the magnetized medical device is brought into proximity of the magnetic sensors 150 of the magnetic-sensor array 146 or inserted into the body of the patient P during an ultrasound-based medical procedure. Such magnetic-based tracking of the magnetized medical device assists the clinician in placing a distal tip thereof in a desired location, such as in a lumen of a blood vessel, by superimposing a simulated needle image representing the real-time distance and orientation of the needle 112 over an ultrasound image of the body of the patient P being accessed by the magnetized medical device. Such a medical device can be stainless steel such as SS 304 stainless steel; however, other suitable needle materials that are capable of being magnetized can be employed. So configured, the needle 112 or the like can produce a magnetic field or create a magnetic disturbance in a magnetic field detectable as magnetic signals by the magnetic-sensor array 146 of the ultrasound probe 106 so as to enable the distance and orientation of the magnetized medical device to be tracked by the ultrasound-imaging system 100 for dynamically adjusting the distance of the activated ultrasonic transducers 149, an orientation of the activated ultrasonic transducers 149, or both the distance and the orientation of the activated ultrasonic transducers 149 with respect to the magnetized medical device.

During operation of the ultrasound-imaging system 100, the probe head 114 of the ultrasound probe 106 is placed against skin of the patient P. An ultrasound beam 152 is produced so as to ultrasonically image a portion of a target such as a blood vessel beneath a surface of the skin of the patient P. The ultrasonic image of the blood vessel can be depicted and stabilized on the display screen 104 of the ultrasound-imaging system 100.

With reference now to FIGS. 3A-3F, multiple embodiments of the ultrasound probe 106 of FIG. 1 are shown. It should be understood that the embodiments are provided to illustrate various components that may be included on the ultrasound probe 106 and further understood that any component (other than the array of transducers) is not necessary. Further, the embodiments may be combined such that a first optional component shown in one embodiment may be added to a second embodiment.

Referring to FIG. 3A, a first embodiment of an ultrasound probe that may be included in the ultrasound-imaging system of FIG. 1 is shown in accordance with some embodiments. The ultrasound probe 106 includes a probe head 114 that houses a mounted linear array of the ultrasonic transducers 148 or a 2-D array of the ultrasonic transducers 148, wherein the ultrasonic transducers 148 are piezoelectric transducers or capacitive micromachined ultrasonic transducers ("CMUTs"). When the ultrasound probe 106 is configured with the 2-D array of the ultrasonic transducers 148, a subset of the ultrasonic transducers 148 is linearly activated as needed for ultrasound imaging in accordance with ultrasound-imaging data, magnetic-field data, shape-sensing data, or a combination thereof to maintain the target in an image plane or switch to a different image plane (e.g., from perpendicular to a medical-device plane to parallel to the medical-device plane) including the target.

The probe head 114 is configured for placement against skin of the patient P proximate a prospective needle-insertion site where the activated ultrasonic transducers 149 in the probe head 114 can generate and emit the generated ultrasound signals into the patient P in a number of pulses, receive reflected ultrasound signals or ultrasound echoes from the patient P by way of reflection of the generated ultrasonic pulses by the body of the patient P, and convert the reflected ultrasound signals into corresponding electrical signals for processing into ultrasound images by the console 102 to which the ultrasound probe 106 is communicatively coupled. In this way, a clinician can employ the ultrasound-imaging system 100 to determine a suitable insertion site and establish vascular access with the needle 112 or another medical device.

The ultrasound probe 106 may further include the control buttons 110 for controlling certain aspects of the ultrasound-imaging system 100 during an ultrasound-based medical procedure, thus eliminating the need for the clinician to reach out of a sterile field around the patient P to control the ultrasound-imaging system 100. For example, a control button of the control buttons 110 can be configured to select or lock onto the target (e.g., a blood vessel, an organ, etc.) when pressed for visualization of the target in preparation for inserting the needle 112 or another medical device into the target. Such a control button can also be configured to deselect the target, which is useful whether the target was selected by the control button or another means such as by holding the ultrasound probe 106 stationary over the target to select the target, issuing a voice command to select the target, or the like.

Figure 3B:
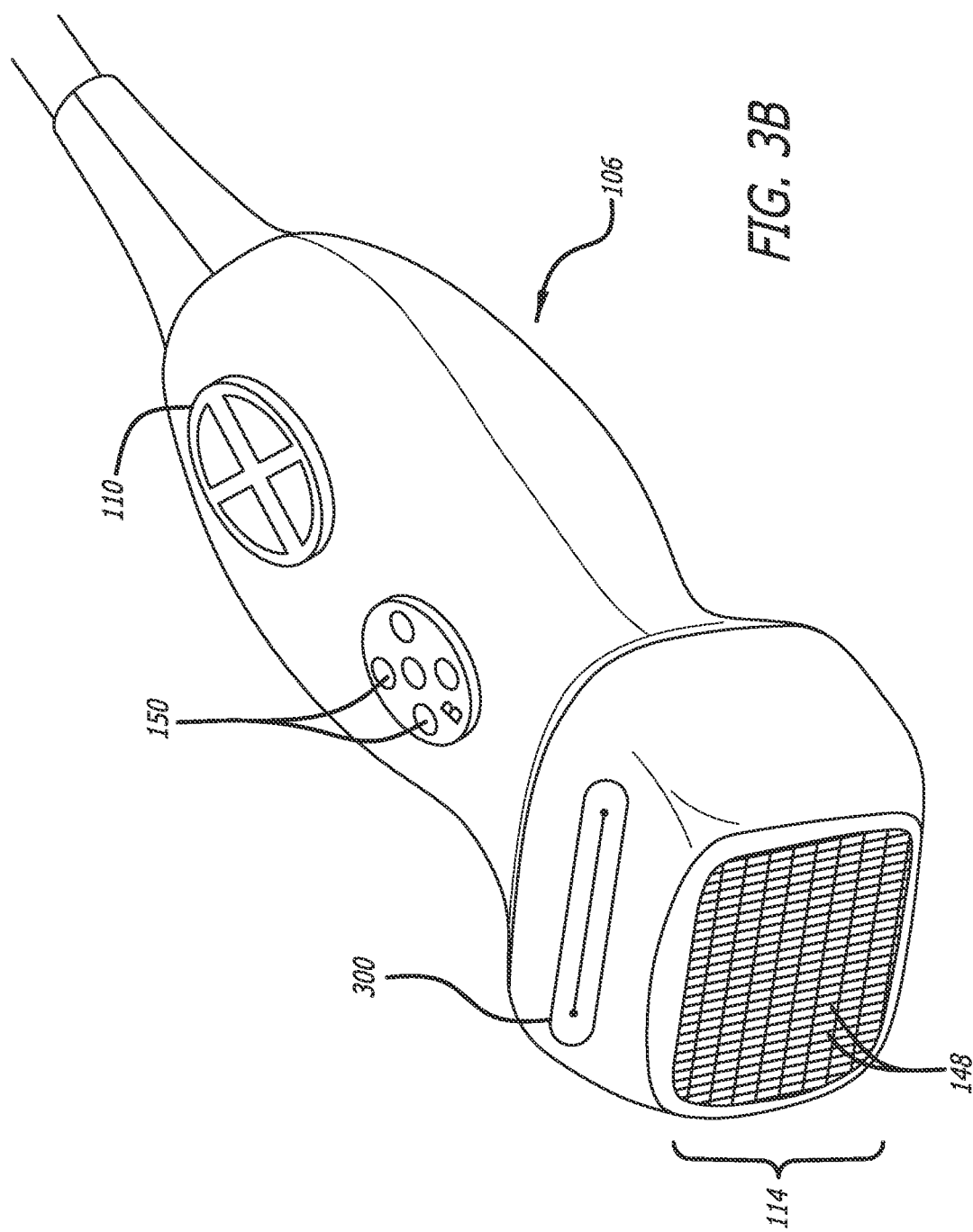
FIG. 3B illustrates a second embodiment of an ultrasound probe that may be included in the ultrasound-imaging system of FIG. 1 in accordance with some embodiments.

FIG. 3B illustrates a second embodiment of an ultrasound probe that may be included in the ultrasound-imaging system of FIG. 1 in accordance with some embodiments. The ultrasound probe 106 of FIG. 3B includes many of the components of the ultrasound probe 106 of FIG. 3A and also includes the barcode scanner 300 integrated directly thereto. For instance, as shown, the barcode scanner 300 may be positioned at a distal end of the ultrasound probe 106 adjacent the probe head 114. However, the barcode scanner 300 may be positioned in alternative locations on the ultrasound probe 106, such as between the control buttons 110 and the magnetic sensors 150.

The barcode scanner 300 may be configured to scan and capture data from a patient identifier (ID) band, a clinician ID card, a device ID tag or label, a medicine ID or label, etc. Thus, advantageously, the ultrasound probe 106 of FIG. 3B enables a clinician to perform multiple tasks that may be required before or during a medical procedure with a single device. This simplifies the clinician's job by eliminating steps of selecting and deploying multiple devices, simplifies the clinician's training by eliminating an additional device to learn to operate, provides for a more sterile environment as fewer components are utilized (reducing possible points of introducing bacteria), etc. Further, the data collected by the ultrasound scanner 106 of FIG. 3B may all be provided to a single console (e.g., console 102 of FIG. 1) such that a single display screen may be generated and provided to the clinician that includes ultrasound imaging information as well as ancillary information such as information related to a scanned barcode (e.g., information of medicine/drugs provided to the patient, patient information, instructions for use of other medical devices deployed, etc.). For instance, see FIG. 5 for an example of such a display screen.

Figure 3C:
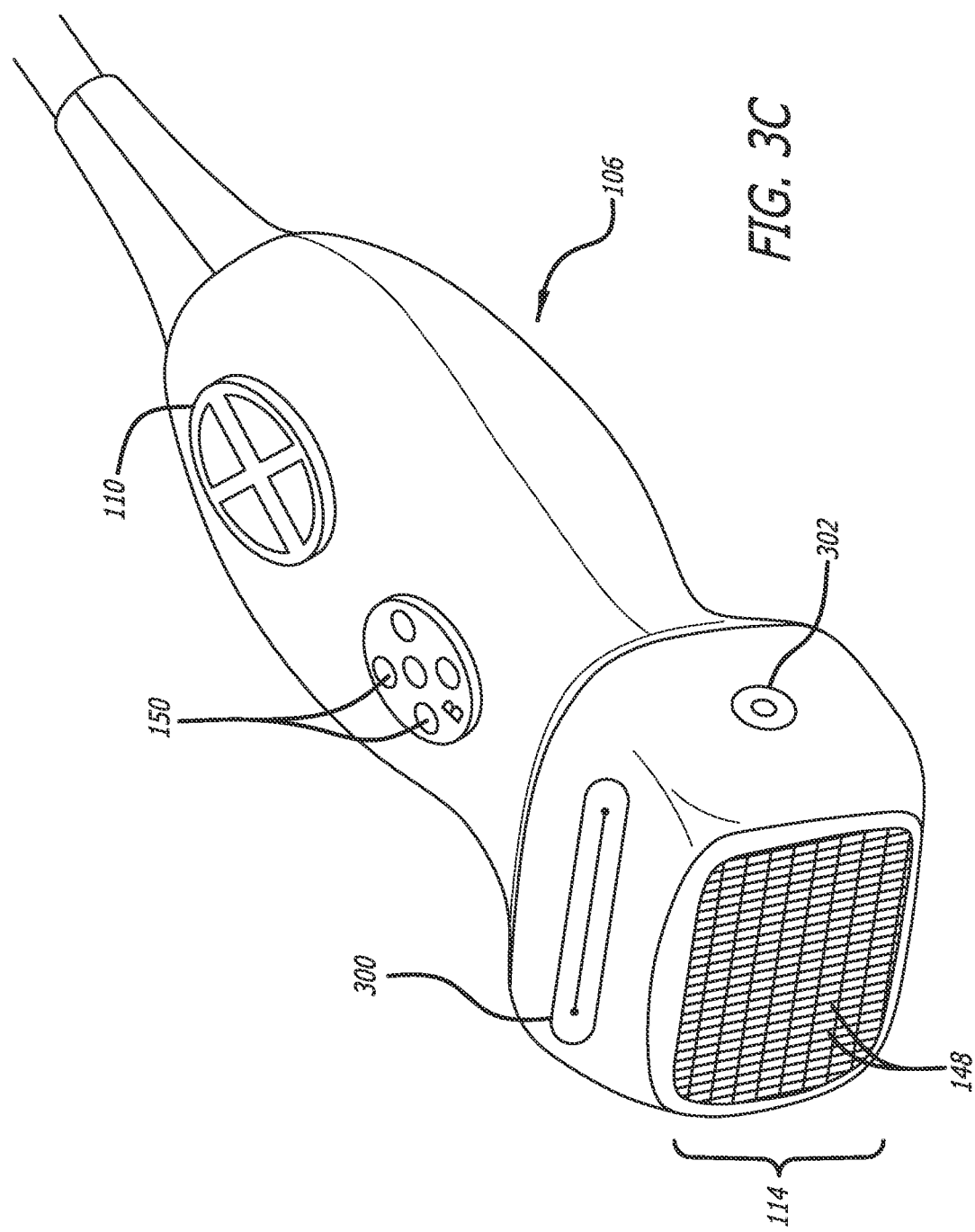
FIG. 3C illustrates a third embodiment of an ultrasound probe that may be included in the ultrasound-imaging system of FIG. 1 in accordance with some embodiments.

FIG. 3C illustrates a third embodiment of an ultrasound probe that may be included in the ultrasound-imaging system of FIG. 1 in accordance with some embodiments. The ultrasound probe 106 of FIG. 3C includes many of the components of the ultrasound probe 106 of FIGS. 3A-3B and also includes the camera 302 integrated directly thereto. For instance, as shown, the camera 302 may be positioned at a distal end of the ultrasound probe 106 adjacent the probe head 114 and the barcode scanner 300. However, the camera 302 may be positioned in alternative locations on the ultrasound probe 106, such as between the control buttons 110 and the magnetic sensors 150. In some embodiments, the camera 302 may be configured to perform similar functionality as the barcode scanner 300. For instance, the images collected by the camera 302 may be provided to logic of the console 100, where the logic may perform image recognition, text recognition or barcode analysis procedures thereon. Thus, it should be understood that in some embodiments, the barcode scanner 300 and the camera 302 need not both be provided. The advantages provided by the integration of the camera 302 into the ultrasound probe 106 are similar to those discussed above with respect to the barcode scanner 300 and FIG. 3B.

Figure 3D:
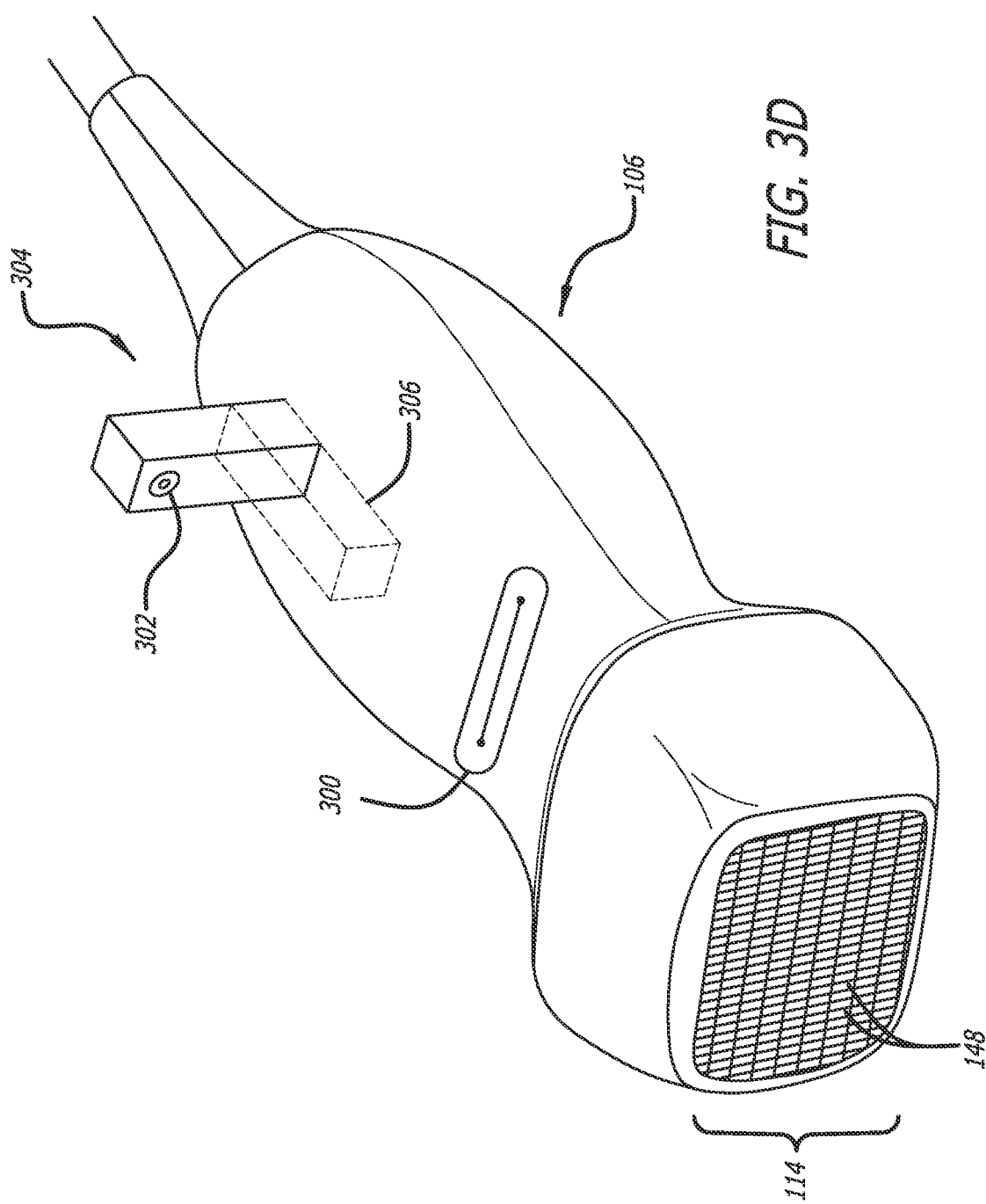
FIG. 3D illustrates a fourth embodiment of an ultrasound probe that may be included in the ultrasound-imaging system of FIG. 1 in accordance with some embodiments.

FIG. 3D illustrates a fourth embodiment of an ultrasound probe that may be included in the ultrasound-imaging system of FIG. 1 in accordance with some embodiments. The ultrasound probe 106 of FIG. 3D includes many of the components of the ultrasound probe 106 of FIGS. 3A-3C and also includes (i) an alternative position of the camera 302, and (ii) the camera 302 positioned on an arm 304 that extends outwardly from the body of the ultrasound probe 106. Additionally, the arm 304 may be optionally rotatable such that a groove 306 may be included in the body of ultrasound probe 106 to receive the arm 304 when rotated from an open position (shown) to a closed position. The positioning of the camera 302 on the arm 304 may enable live imaging, such as of an insertion site of the patient for a medical device (e.g., a needle). Additionally, the insertion process may be recorded by the camera 302 in the position shown in FIG. 3D for viewing at a subsequent time (e.g., to assess the insertion procedure). The advantages provided by the integration of the camera 302 into the ultrasound probe 106 are similar to those discussed above with respect to the barcode scanner 300 and FIG. 3B.

Figure 3E:
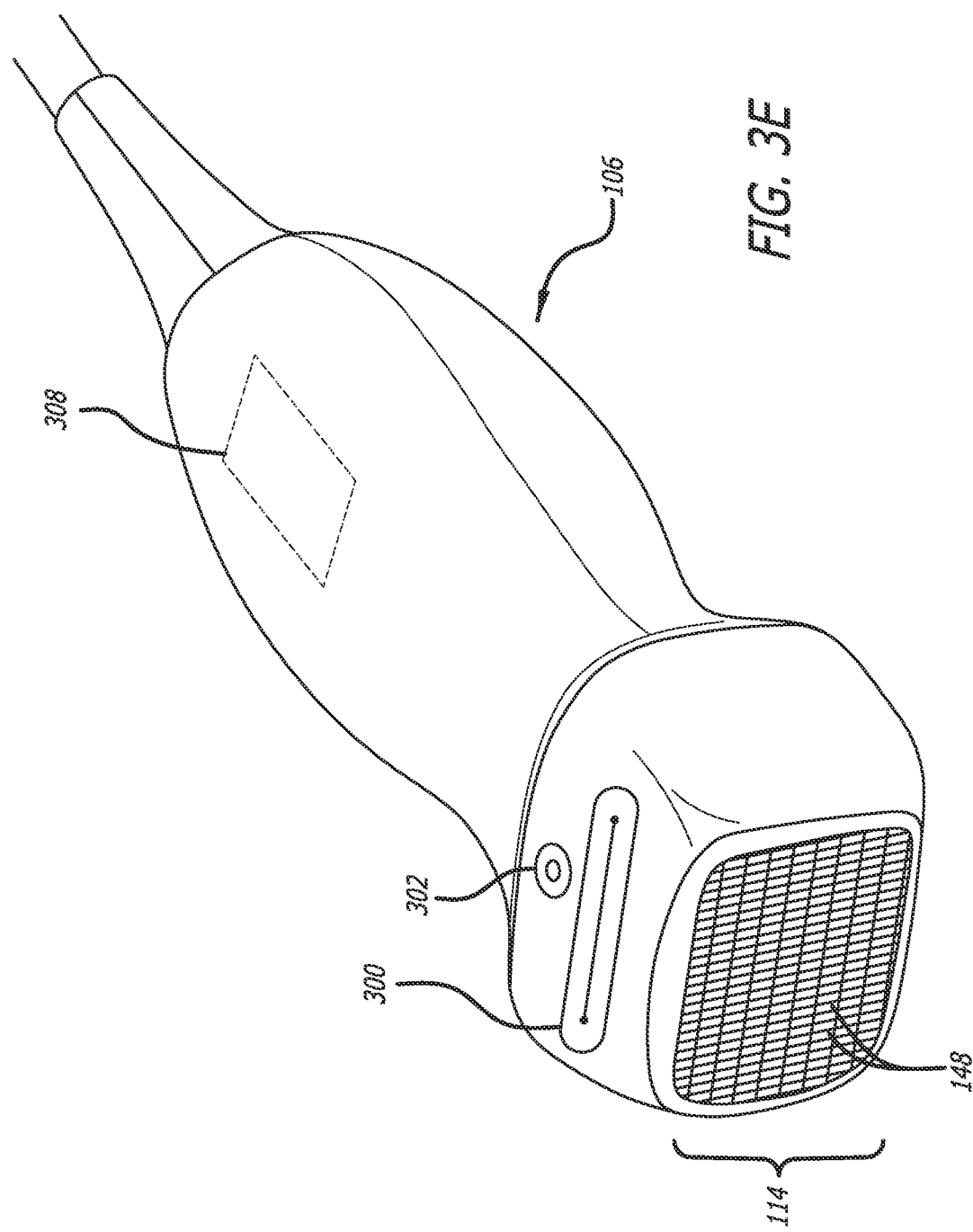
FIG. 3E illustrates a fifth embodiment of an ultrasound probe that may be included in the ultrasound-imaging system of FIG. 1 in accordance with some embodiments.

FIG. 3E illustrates a fifth embodiment of an ultrasound probe that may be included in the ultrasound-imaging system of FIG. 1 in accordance with some embodiments. The ultrasound probe 106 of FIG. 3E includes many of the components of the ultrasound probe 106 of FIGS. 3A-3E and also includes (i) an alternative position of the camera 302, and (ii) an RFID sensor 308 integrated into the body of the ultrasound probe 106. The RFID sensor 308 may be configured to obtain radio-frequency signals from certain devices such as a clinician's ID card and/or medical device packaging. The advantages provided by the integration of the RFID sensor 308 into the ultrasound probe 106 are similar to those discussed above with respect to the embodiment of FIG. 3E.

FIG. 3F illustrates a sixth embodiment of an ultrasound probe that may be included in the ultrasound-imaging system of FIG. 1 in accordance with some embodiments. FIG. 3F is similar to the embodiment of FIG. 3D in that the camera 302 is positioned on an arm 310 extending outwardly from the ultrasound probe 106. In FIG. 3F, the arm 310 extends from a position distal the position of the arm 304 in FIG. 3D. The advantages provided by the integration of the camera 302 into the ultrasound probe 106 are similar to those discussed above with respect to the barcode scanner 300 and FIG. 3B.

Figure 4:
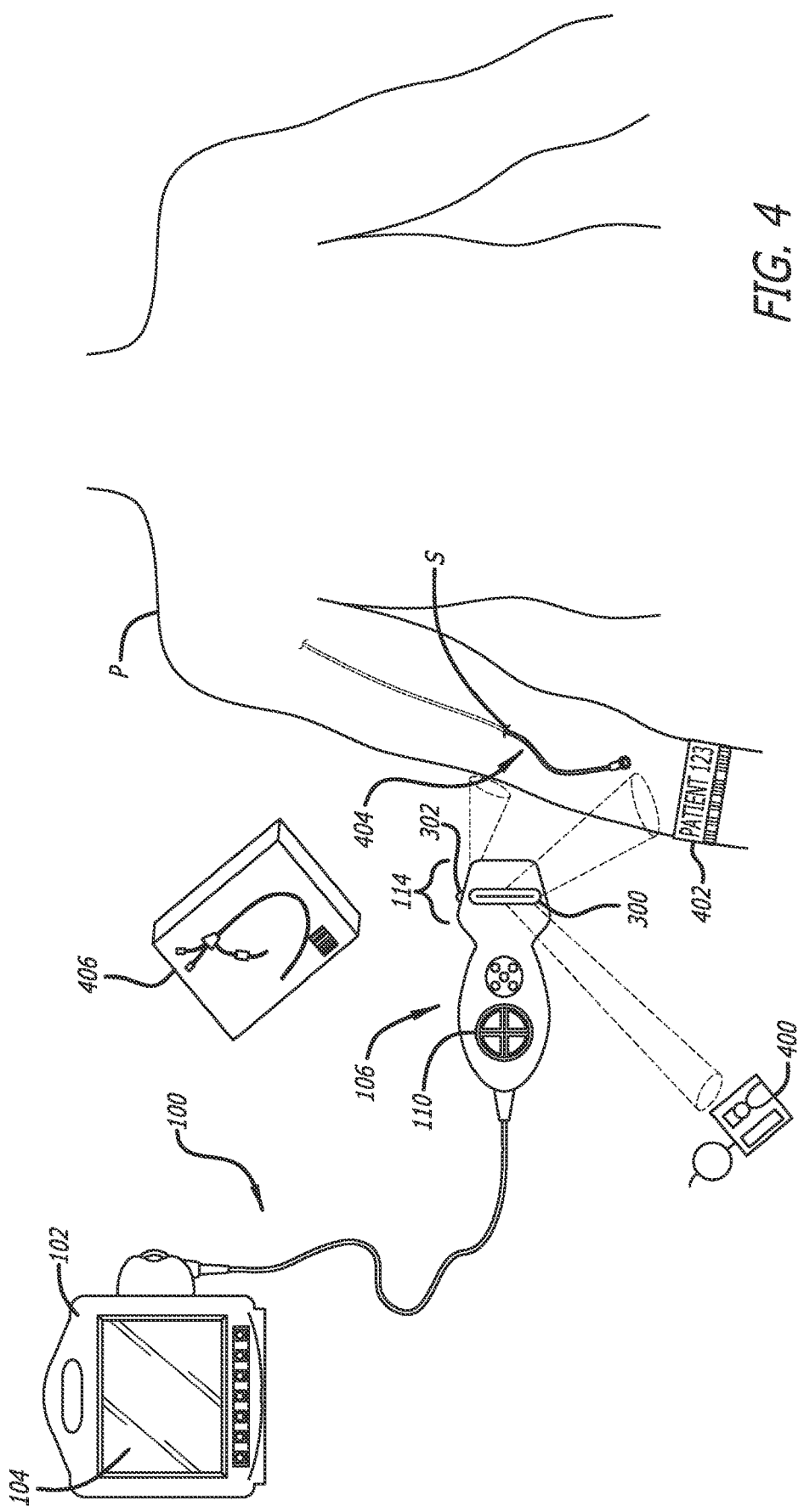
FIG. 4 illustrates the ultrasound-imaging system of FIG. 1, a clinician, medical device packaging, and a patient in accordance with some embodiments.

FIG. 4 illustrates the ultrasound-imaging system of FIG. 1, a clinician, medical device packaging, and a patient in accordance with some embodiments. The embodiment of FIG. 4 provides an illustration of various possible use cases for embodiments of the ultrasound probe 106 discussed above. For instance, an embodiment of the ultrasound probe 106 including the barcode scanner 300 may be utilized to scan barcodes on a clinician ID card 400 and/or a patient ID bracelet 402. Additionally, an embodiment of the ultrasound probe 106 including the camera 302 may be configured to image the insertion site S as the medical device 404 is inserted into the patient P. Additionally, the camera 302 may capture an image of the packaging 406 of a medical device (e.g., of the medical device 404) where the captured image is analyzed, e.g., through image recognition, optical character recognition, and/or barcode analysis procedures performed by logic of the console 102.

Figure 5:
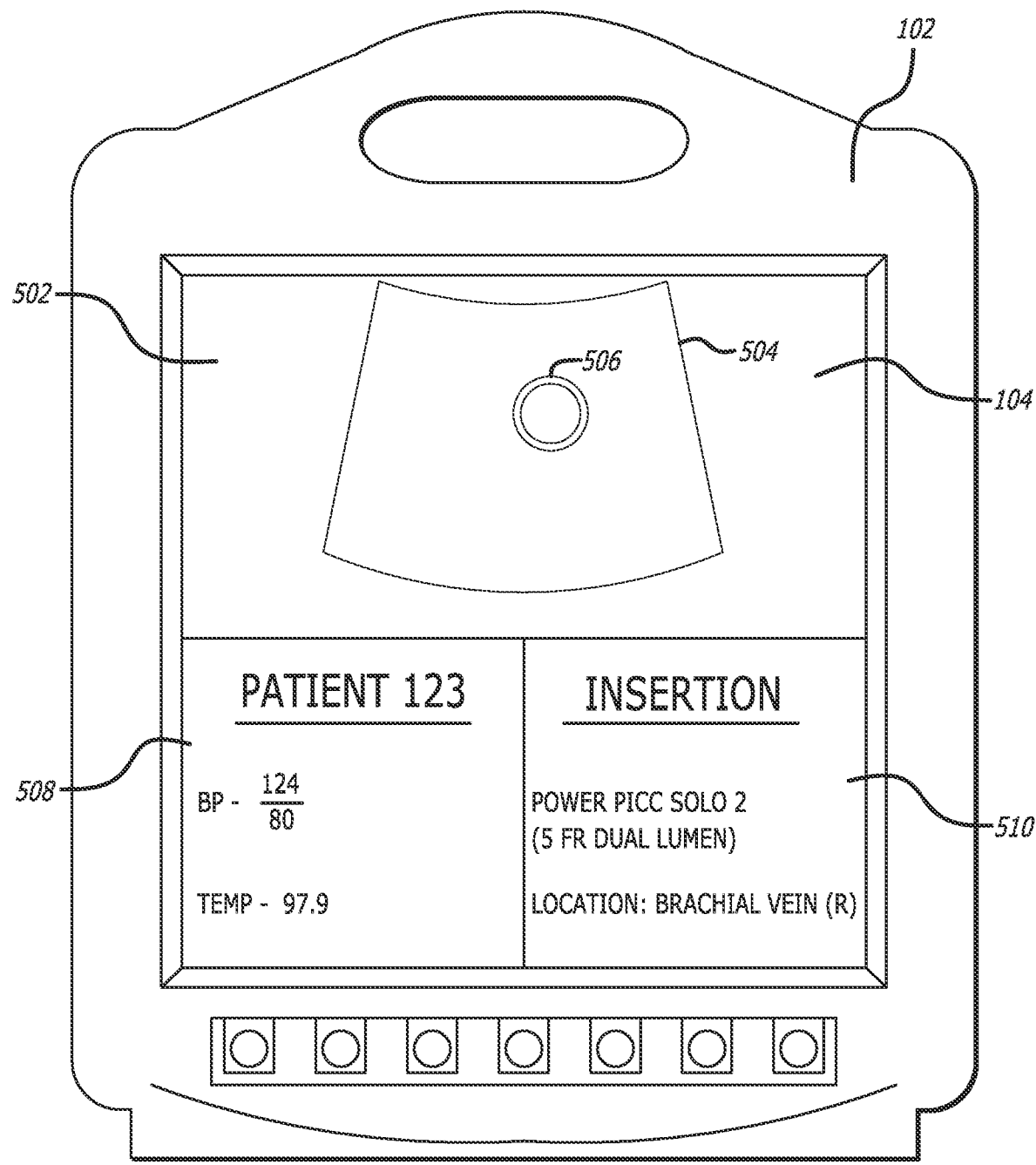
FIG. 5 illustrates an embodiment of a display an ultrasound image, patient information and medical device information rendered on the display screen of the ultrasound-imaging system of FIG. 1 in accordance with some embodiments.

FIG. 5 illustrates an embodiment of a display an ultrasound image, patient information and medical device information rendered on the display screen of the ultrasound-imaging system of FIG. 1 in accordance with some embodiments. FIG. 5 provides an illustration of the console 102 including the display screen 104, where a display 502 is rendered thereon. The display is shown to include an ultrasound image 504 (and a target vessel 506) in a first portion of the display 502, patient information 508 in a second portion of the display 502 (e.g., blood pressure and temperature, which may be obtained through deployment of other devices). Advantageously, the inclusion of an ancillary scanning component (e.g., barcode scanner and/or camera) that is configured to obtain data identifying the patient (e.g., scanning or imaging a patient ID bracelet) may allow for automated syncing of patient information 508 with the ultrasound image 504. For example, logic of the console 102 may utilize the data identifying the patient obtained through use of the ultrasound probe 106 to retrieve patient information 508 and incorporate such into the display 502. Similarly, insertion instructions 510 are included in a third portion of the display 502, where the insertion instructions 510 may be obtained in a similar manner as the patient information 508 (e.g., scan/image a medical device or corresponding packaging, retrieve insertion instructions 510 from a database using the data obtained via the scan/image of the medical device or corresponding packaging where the scanning/imaging was performed using the ultrasound probe 106).

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An ultrasound-imaging system, comprising:
    an ultrasound probe including (i) an array of ultrasonic transducers, activated ultrasonic transducers of the array of ultrasonic transducers configured to emit generated ultrasound signals into a patient, receive reflected ultrasound signals from the patient, and convert the reflected ultrasound signals into corresponding electrical signals of the generated ultrasound signals for processing into an ultrasound image, and (ii) a secondary data collection module including a rotatable arm having a camera positioned thereon, wherein the ultrasound probe includes a groove that is configured to receive the rotatable arm when in a closed position; and
    a console configured to communicate with the ultrasound probe, the console including one or more processors and a non-transitory computer-readable medium having stored thereon logic, when executed by the one or more processors, causes operations including:
        receiving and processing the corresponding electrical signals to generate the ultrasound image,
        receiving secondary data from the secondary data collection module, wherein the secondary data includes image data from the camera, and
        generating a graphical user interface (GUI) is rendered on a display screen of a network device, wherein the GUI includes at least a portion of the image data.

2. The ultrasound-imaging system of claim 1, wherein the secondary data collection module further includes a barcode scanner and the secondary data further includes barcode data.

3. The ultrasound-imaging system of claim 2, wherein the barcode data identifies one of the patient, a clinician, or a medical device, and wherein a notification includes information corresponding to the patient, the clinician, or the medical device.

4. The ultrasound-imaging system of claim 1, wherein the image data includes a medical device, a packaging of the medical device, a patient identifier, a clinician identifier, or an insertion site of the patient.

5. The ultrasound-imaging system of claim 1, wherein the image data includes a video capturing insertion of a medical device into the patient.

6. The ultrasound-imaging system of claim 1, wherein the network device is the console, wherein the GUI includes the ultrasound image and additional information being at least one of (i) patient information, or (ii) medical device information.

7. The ultrasound-imaging system of claim 1, wherein the secondary data collection module further includes a radio-frequency identifier (RFID) sensor and the secondary data further includes RFID data.

8. An ultrasound probe apparatus comprising:
    an array of ultrasonic transducers, activated ultrasonic transducers of the array of ultrasonic transducers configured to emit generated ultrasound signals into a patient, receive reflected ultrasound signals from the patient, and convert the reflected ultrasound signals into corresponding electrical signals of the generated ultrasound signals for processing into an ultrasound image; and a secondary data collection module including a rotatable arm having a camera positioned thereon, wherein the ultrasound probe apparatus includes a groove that is configured to receive the rotatable arm when in a closed position, wherein the secondary data collection module is configured to collect secondary data including image data from the camera.

9. The ultrasound probe apparatus of claim 8, wherein the secondary data collection module further includes a barcode scanner and the secondary data further includes barcode data.

10. The ultrasound probe apparatus of claim 9, wherein the barcode data identifies one of the patient, a clinician, or a medical device, and wherein a notification includes information corresponding to the patient, the clinician, or the medical device.

11. The ultrasound probe apparatus of claim 8, wherein the image data includes a medical device, a packaging of the medical device, a patient identifier, a clinician identifier, or an insertion site of the patient, or video capturing insertion of the medical device into the patient.

12. The ultrasound probe apparatus of claim 8, wherein the-network device is a console, wherein a GUI includes the ultrasound image and additional information being at least one of (i) patient information, or (ii) medical device information.

13. The ultrasound probe apparatus of claim 8, wherein the secondary data collection module further includes a radio-frequency identifier (RFID) sensor and the secondary data further includes RFID data.

14. A method of utilizing an ultrasound-imaging system including a non-transitory computer-readable medium having executable instructions that cause the ultrasound-imaging system to perform a set of operations for ultrasound imaging when the executable instructions are executed by a processor of a console of the ultrasound-imaging system, the method comprising:

activating ultrasonic transducers of an array of ultrasonic transducers of an ultrasound probe communicatively coupled to the console, whereby the ultrasonic transducers emit generated ultrasound signals into a patient, receive reflected ultrasound signals from the patient, and convert the reflected ultrasound signals into corresponding electrical signals of the generated ultrasound signals for processing into ultrasound images;

activating a secondary data collection module of the ultrasound probe, wherein the secondary data collection module includes a rotatable arm having a camera positioned thereon, and wherein the ultrasound probe includes a groove that is configured to receive the rotatable arm when in a closed position;

receiving and processing the corresponding electrical signals to generate the ultrasound images;

receiving secondary data from the secondary data collection module, wherein the secondary data includes image data from the camera; and generating a graphical user interface (GUI) that is rendered on a display screen of a network device, wherein the GUI that includes at least a portion of the image data.

15. The method of claim 14, wherein the secondary data collection module further includes a barcode scanner and the secondary data further includes barcode data.

16. The method of claim 15, wherein the barcode data identifies one of the patient, a clinician, or a medical device, and wherein a notification includes information corresponding to the patient, the clinician, or the medical device.

17. The method of claim 14, wherein the image data includes a medical device, a packaging of the medical device, a patient identifier, a clinician identifier, or an insertion site of the patient.

18. The method of claim 14, wherein the image data includes a video capturing insertion of a medical device into the patient.

19. The method of claim 14, wherein the network device is the console, wherein the GUI includes the ultrasound images and additional information being at least one of (i) patient information, or (ii) medical device information.

20. The method of claim 14, wherein the secondary data collection module further includes a radio-frequency identifier (RFID) sensor and the secondary data further includes RFID data.

* * * * *